UNITED STATES PATENT OFFICE.

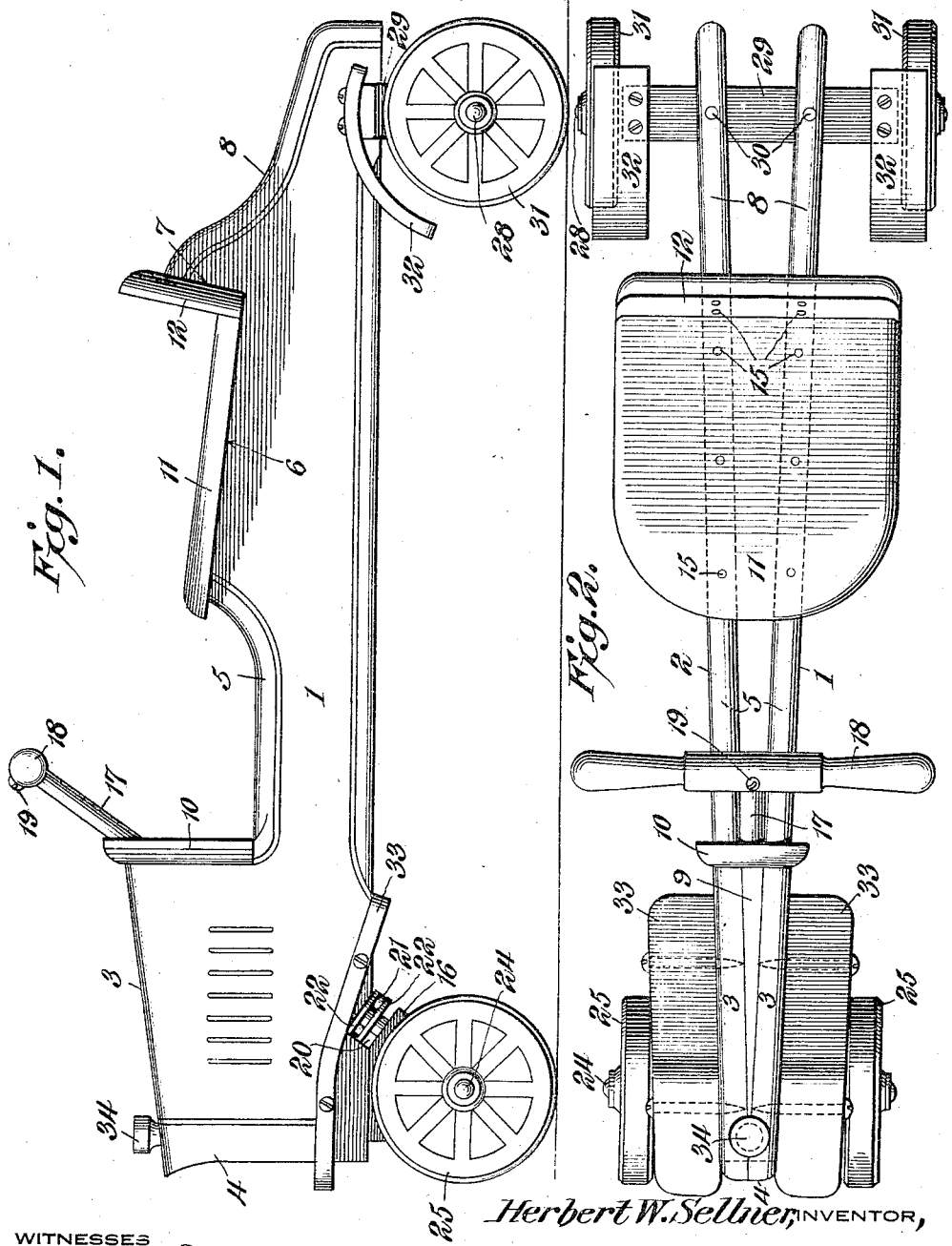

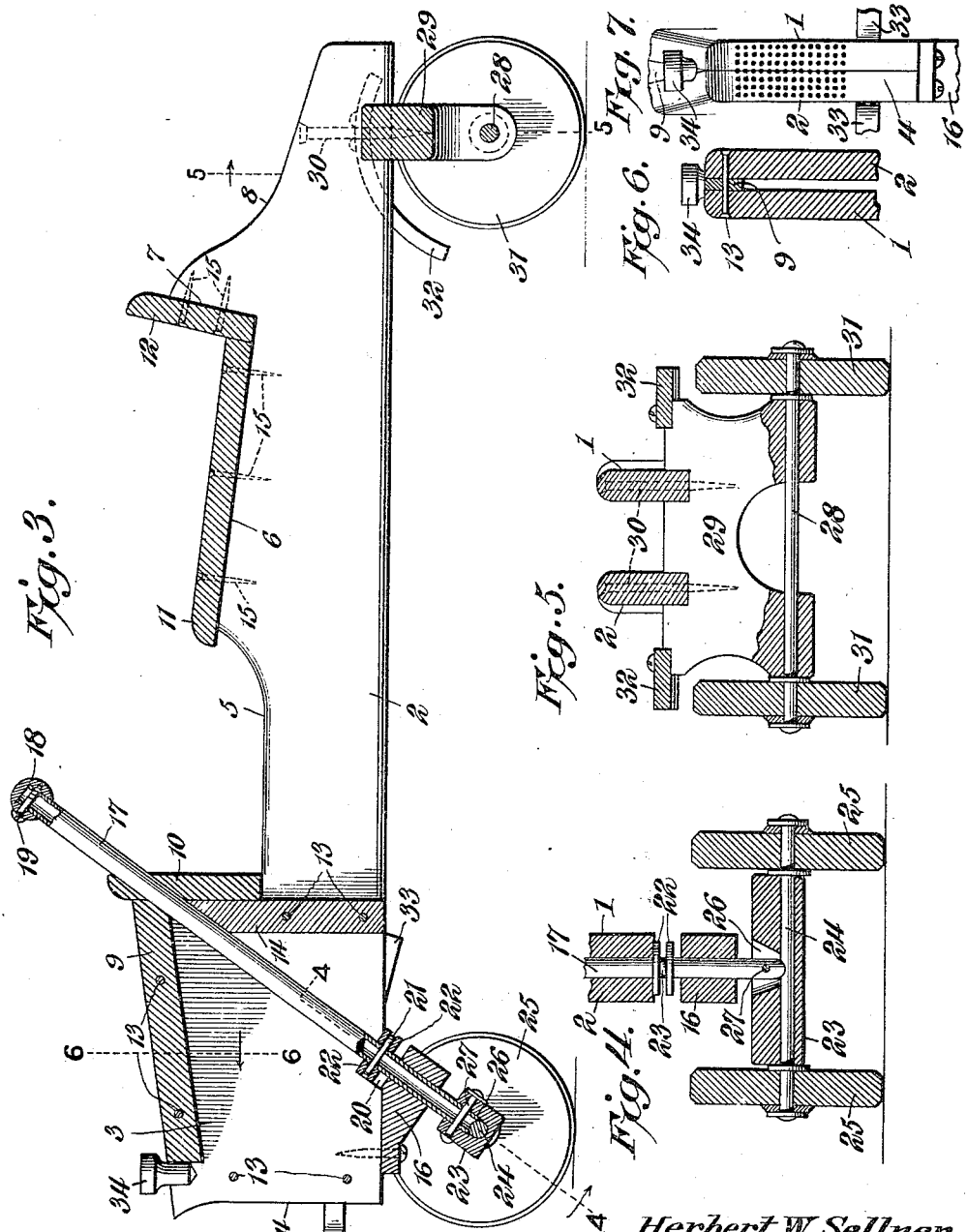

HERBERT WALTER SELLNER, OF FARIBAULT, MINNESOTA, ASSIGNOR TO IDEAL LAMP MANUFACTURING COMPANY, OF FARIBAULT, MINNESOTA, A CORPORATION OF MINNESOTA.

TOY VEHICLE.

1,282,003. Specification of Letters Patent. Patented Oct. 15, 1918.

Application filed December 31, 1917. Serial No. 209,654.

*To all whom it may concern:*

Be it known that I, HERBERT W. SELLNER, a citizen of the United States, residing at Faribault, in the county of Rice and State of Minnesota, have invented a new and useful Toy Vehicle, of which the following is a specification.

This invention has reference to toy vehicles, and its object is to provide a vehicle of a size to support and be propelled by a child, the vehicle, in general appearance, simulating an automobile.

The invention comprises a body portion of particularly rigid construction, but capable of being manufactured of relatively light material. The body is provided with wheels, the rear pair of which have their axle rigidly connected to the body, while the forward pair of wheels have their axle sustained by a king bolt slanted similarly to the steering post of an automobile and constituting the sole connection between the front or steering wheels and the body of the vehicle. Furthermore, the steering wheels are arranged to rock with relation to the steering post to provide a floating connection contributing to the ease of riding on the vehicle.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified so long as such changes and modifications come within the scope of the appended claims.

In the drawings:—

Figure 1 is a side elevation of a vehicle embodying the invention;

Fig. 2 is a plan view of the structure shown in Fig. 1;

Fig. 3 is a longitudinal vertical central section of the vehicle, with some parts shown in elevation;

Fig. 4 is a section on the line 4—4 of Fig. 3;

Fig. 5 is a section on the line 5—5 of Fig. 3;

Fig. 6 is a section on the line 6—6 of Fig. 3;

Fig. 7 is an elevation of a portion of the front of the vehicle.

While the particular material which may be used in the practical embodiment of the invention may be varied, wood has been found to be particularly adapted for the purpose.

In the following description, it will be assumed that the vehicle is constructed in most part of wood, without, however, limiting the invention to the use of such particular material.

There is provided a body portion consisting of two boards 1 and 2 respectively, which boards are substantially identical, and therefore a description of one will apply to both. The boards are set vertically edgewise, and each is as long as the vehicle and relatively thin. For instance, a vehicle constructed in accordance with the invention may be about 2½ feet long, with the widest portion of the boards between 6 and 7 inches, and the thickness of each board about ¾ of an inch. These dimensions, however, are not at all controlling.

The front portion 3 of each board is in outline similar to the outline of the hood portion of an automobile, and at the front 4, the board is shaped in simulation of an automobile radiator. Back of the hood portion 3, the height of each board is cut down to form a depression 5, back of which the height of each board is again increased, and then is formed with a downwardly slanting continuation 6 terminating in an upright shoulder 7, from which the rear portion 8 of the board is decreased in height to the rear end of the vehicle.

The two boards 1 and 2 are joined at the front end 4 and from thence gradually separate, so as to form a rearwardly expanding body considerably wider at the rear end than the front end. Throughout that portion of the body determined by the hood section 3, there is a taper filling piece or strip 9, and immediately back of the hood there is provided another piece 10 wider than the portion of the body where it is located and extending from the depression 5 above the hood, thus simulating a dash.

Fast to the side boards 1 and 2 along the slanting portion 6 is a seat 11 overhanging the boards 1 and 2 and of sufficient width and length to accommodate a child. There is also provided a back 12 rising from the seat 6 along the upright slanting portion 7 of the sides 1 and 2. The boards 1 and 2 are secured together at their forward meeting ends in any suitable manner as by nails or screws, and similar fastening means may be employed where the filling strip 9 is located, such fastening devices being shown at 13 without, however, limiting the location of these fastening devices to such particular places as indicated. There is also another filling in piece 14 back of the dash 10 and extending to the bottom of the vehicle body, this filling in piece being shown in Fig. 3.

Nails 15 or other suitable fastening devices may be employed to secure the seat 11 and back 12 in place. The bottom portions of the boards 1 and 2 near the front of the hood section 3 have a block 16 fast to them, this block being in part in slanting or angular relation to the length of the vehicle.

Extending through the dash 10 at a high point thereof and downwardly through the hood 3 and through the block 16, is a steering post 17 which may be in the form of a tube, as shown. At the upper end above the body of the vehicle a steering handle 18 is applied to the steering post 17, and may be held thereto by a screw 19 or in any other appropriate way, the screw aiding in preventing the handle from turning independently of the steering post.

Where the steering post extends downwardly from the hood toward the block 16, the two side boards are in close approach, although not in actual contact. The bottom portions of the boards 1 and 2 are notched or cut back as shown at 20, where the steering post passes through the block 16 to accommodate a pin 21 traversing the post, so that washers 22 can be applied to the post on opposite sides of the pin 21. The pin 21 may be a cotter pin, although not necessarily so.

At the lower end of the steering post there is a steering axle 23 which may be formed in the main of wood, and carries to one side of its longitudinal center line a rod 24 preferably of metal and in turn carrying wheels 25 constituting the steering wheels of the vehicle. The axle 23 is formed with a recess 26 into which the steering post enters, the axle being made fast to the steering post by a pin 27 traversing the steering post and the adjacent portion of the axle, so that the latter may rock on the steering post in a plane lengthwise of the axle. In this way, the front or steering axle has a floating mounting on the steering post permitting it to respond to variations in level in the surface along which the vehicle may be traveling. The steering post is connected to the mid portion of the axle, and constitutes the sole support for the front end of the vehicle. The steering post has journal bearings in the block 16 and in the dash 10 and adjacent parts, while the washers 22 and pin 21 perform the function of a step bearing for the steering post. These constructions render the steering of the vehicle extremely easy and permit the running of the vehicle over uneven surfaces without distortions of the vehicle because of the accommodation of the floating front or steering axle to uneven surfaces.

The rear axle of the vehicle is in the form of a rod 28 carried by a bolster 29 to which the rear portions of the side boards 1 and 2 are secured by screws 30 or otherwise. The axle 28 has wheels 31 mounted thereon, these wheels having a greater spread laterally of the vehicle than the front or steering wheels, so that the rear of the vehicle near which portion the rider is located has sufficient stability without necessitating as wide a spread of the steering wheels, wherefore the steering is made correspondingly easy.

Mud guards 32 for the rear wheels are secured to the bolster 29 at appropriate points, and other mud guards 33 are secured to the boards 1 and 2 at the sides of the hood section thereof, such guards 33 being positioned and shaped to constitute foot rests for the rider of the vehicle.

The automobile simulation of the vehicle is further enhanced by a plug 34 on the top of the radiator portion 4 in representation of the customary filling plug for the radiator.

The vehicle is propelled by the feet of the person supported by the seat 11, the height of the vehicle being such that the rider may push against the ground with the feet and thus cause the vehicle to move. At the same time the steering is performed by the rider.

The vehicle for the purpose for which the invention is designed is subjected to particularly severe conditions, and hence to withstand such conditions should be markedly sturdy. This is brought about by the taper construction of the body from the rear toward the front, rendering the attachment of the bolster 29 and the two boards 1 and 2 where spaced apart at the rear end especially resistant to destructive forces. The front of the vehicle is also especially resistant to destructive forces because of the increased thickness due to the junction of the two boards 1 and 2. The seat 11 and back 12 also contribute to stiffening the structure. The steering post simplifies the structure by constituting the sole connection between the steering axle and the body of the vehicle, and having widely separated journal bearings, and a firm step bearing, amply connects the steering wheels with the body of the vehicle.

In the finished vehicle, the resemblance of the structure to an automobile may be markedly increased by suitably painting the vehicle.

The vehicle is readily knocked down for storing or transportation by removing the handle 18 and pin 21, whereupon the steering post and front axle may be disconnected from the vehicle body, and by removing the screws 30 which permit the bolster 29 and rear wheels 31 to be disconnected from the vehicle.

What is claimed is:—

1. A vehicle comprising a body portion composed of two elongated relatively thin members set vertically edgewise and converging toward their front ends, their rear ends being spaced apart, means for securing said front ends together, so that they constitute the front portion of the vehicle, said front portion being shaped to simulate the front portion of an automobile, a dashboard closing the rear end of said front portion and secured to the members, a seat on the body spaced from the dashboard and also secured to said members, and foot rests extending out from the front portion at the bottom and shaped to simulate mud guards.

2. A vehicle comprising a body portion composed of two elongated thin members set vertically edgewise and joined at the front ends, said members gradually separating toward the rear end of the vehicle, and each having a relatively high front portion with filling means closing the space between them throughout the high front portion, a dash board closing the rear end of the high front portion and secured to the members, a seat on the body spaced rearwardly from the high front portion and connecting the members, and wheels for the body portion.

3. A vehicle comprising two thin longitudinally disposed members set vertically edgewise and joined at the forward ends, said members gradually receding one away from the other toward the rear end of the vehicle, a seat, rear wheels, steering wheels, and a steering post constituting the sole connection between the body of the vehicle and the steering wheels and located between the said members.

4. A vehicle comprising a body, front and rear axles and wheels at the front and rear ends of the body, with the front wheels constituting steering wheels, a seat on the body portion, and a steering post having its lower end secured to the front axle and constituting the sole connection between the steering wheels and the body and extending upward through the front portion of the body and provided with journal bearings in said front portion of the body.

5. A vehicle comprising a body, wheels at the front and rear ends of the body, with the front wheels constituting steering wheels, a seat on the body, and a steering post having its lower end directly connected to the axle of said steering wheels, and constituting the sole connection between the steering wheels and the body and extending upward through the front portion of the body and provided with journal bearings in said front portion of the body, said steering post also having a step bearing between the journal bearings.

6. A vehicle comprising an elongated relatively thin body portion set vertically edgewise, a seat on the body portion, wheels for sustaining the body portion, with one pair of wheels constituting steering wheels, and foot rests on the body portion extending over the steering wheels, said vehicle also being provided with a steering post extending diagonally upward from the steering wheels through the body portion and constituting the sole connection between the steering wheels and body portion.

7. A vehicle comprising a relatively thin body portion set vertically on edge and formed of two longitudinally disposed members joined at their forward ends and diverging toward their rear ends, wheels for the front and rear ends of the vehicle, a steering post for the front wheels and extending diagonally upward through the body portion, and a seat slanting downwardly from the front edge toward the rear edge.

8. A vehicle comprising a body portion consisting of two relatively thin boards shaped to simulate the outlines of an automobile, said boards being joined at the forward ends and gradually diverging toward the rear ends, a seat secured to and connecting the boards, wheels on which the body is mounted, and a steering post connected to the forward pair of wheels and extending diagonally upward through the body portion toward the part of the body provided with the seat, said steering post constituting the sole connection between the body portion and the steering wheels.

9. A vehicle comprising a relatively thin body portion set on edge, a bolster and wheels carried thereby and removably connected to the rear end of the body portion, steering wheels at the forward end of the body portion, a steering post extending from the steering wheels diagonally upward through the forward end of the body, and constituting the sole connection between the steering wheels and the body of the vehicle, a removable handle on the steering post, and removing bearings for the steering post, whereby the body, rear wheels and the steering wheels with the steering post may be readily removed one from the other for storage or transportation.

In testimony that I claim the foregoing as my own, I have hereto affixed my signature in the presence of two witnesses.

HERBERT WALTER SELLNER.

Witnesses:
FRANK W. HARTAF,
GEORGE ROEHRICK.

Copies of this patent may be obtained for five cents each, by addressing the "Commissioner of Patents, Washington, D. C."